(12) United States Patent
Lang et al.

(10) Patent No.: US 10,789,860 B2
(45) Date of Patent: Sep. 29, 2020

(54) LABEL

(71) Applicant: Labelmakers Group Pty Ltd, Somerton, Victoria (AU)

(72) Inventors: Graeme Lang, Research (AU); Michael Profenna, Whittlesea (AU)

(73) Assignee: Labelmakers Group Pty Ltd, Somerton, Victoria (AU)

( * ) Notice: Subject to any disclaimer, the term of this patent is extended or adjusted under 35 U.S.C. 154(b) by 471 days.

(21) Appl. No.: 15/424,170

(22) Filed: Feb. 3, 2017

(65) Prior Publication Data

US 2017/0229046 A1     Aug. 10, 2017

(30) Foreign Application Priority Data

Feb. 5, 2016 (AU) .................. 2016900383

(51) Int. Cl.
*G09F 3/02*     (2006.01)
*G09F 3/10*     (2006.01)
(Continued)

(52) U.S. Cl.
CPC .............. *G09F 3/0291* (2013.01); *B32B 7/06* (2013.01); *B32B 27/08* (2013.01); *B32B 27/302* (2013.01); *B32B 27/304* (2013.01); *B32B 27/32* (2013.01); *B32B 27/325* (2013.01); *B32B 27/36* (2013.01); *B32B 37/06* (2013.01); *B32B 37/12* (2013.01); *B32B 37/144* (2013.01); *B32B 38/10* (2013.01); *C09J 7/241* (2018.01); *C09J 7/245* (2018.01); *C09J 7/255* (2018.01); *C09J 7/35* (2018.01); *C09J 7/387* (2018.01); *C09J 153/02* (2013.01); *G09F 3/10* (2013.01); *B32B 2250/03* (2013.01); *B32B 2250/24* (2013.01); *B32B 2255/10* (2013.01); *B32B 2255/26* (2013.01); *B32B 2307/30* (2013.01); *B32B 2307/518* (2013.01); *B32B 2307/72* (2013.01); *B32B 2307/732* (2013.01); *B32B 2307/748* (2013.01); *B32B 2307/75* (2013.01); *B32B 2309/02* (2013.01); *B32B 2309/105* (2013.01); *B32B 2405/00* (2013.01); *B32B 2519/00* (2013.01); *C09J 2201/122* (2013.01); *C09J 2201/162* (2013.01); *C09J 2201/61* (2013.01);
(Continued)

(58) Field of Classification Search
None
See application file for complete search history.

(56) References Cited

U.S. PATENT DOCUMENTS 6,680,097 B1 * 1/2004 Amberger ................ G09F 3/02
                                                                                                                                                                      134/10
8,304,073 B2 * 11/2012 Davies .................... B32B 27/32
                                                                                                                                                                      428/354
(Continued)

*Primary Examiner* — Frank D Ducheneaux
(74) *Attorney, Agent, or Firm* — Michael Best & Friedrich LLP

(57) ABSTRACT

A label comprising a body having a first side for attaching to a container and a second side for displaying information, the first side includes a releasable adhesive for attaching the label to a container, wherein the releasable adhesive is treatable to cause the label to be separated from the container, and at least a part of the body is heat sensitive such that the label curls towards the first side to conceal part of the releasable adhesive when the label is heated to hinder the label separated from the container from re-attaching to the container.

20 Claims, 3 Drawing Sheets

(51) Int. Cl.
    *B32B 7/06*     (2019.01)
    *B32B 27/08*     (2006.01)
    *B32B 38/10*     (2006.01)
    *B32B 27/30*     (2006.01)
    *B32B 27/32*     (2006.01)
    *B32B 27/36*     (2006.01)
    *B32B 37/14*     (2006.01)
    *B32B 37/06*     (2006.01)
    *B32B 37/10*     (2006.01)
    *C09J 7/24*     (2018.01)
    *C09J 7/25*     (2018.01)
    *C09J 7/35*     (2018.01)
    *C09J 7/38*     (2018.01)
    *C09J 153/02*     (2006.01)
    *G09F 3/00*     (2006.01)
    *B32B 37/12*     (2006.01)

(52) U.S. Cl.
    CPC ...... *C09J 2203/334* (2013.01); *C09J 2425/00* (2013.01); *C09J 2453/00* (2013.01); *G09F 2003/023* (2013.01); *G09F 2003/0241* (2013.01); *G09F 2003/0244* (2013.01); *G09F 2003/0272* (2013.01)

(56) References Cited

U.S. PATENT DOCUMENTS

| | | | |
|---|---|---|---|
| 9,387,652 B2* | 7/2016 | Doornheim | B32B 7/02 |
| 2010/0051200 A1* | 3/2010 | Mueller | C09J 133/08 |
| | | | 156/703 |
| 2011/0215018 A1* | 9/2011 | Schneider | C09J 5/06 |
| | | | 206/459.5 |
| 2013/0146230 A1* | 6/2013 | Davies | G09F 3/02 |
| | | | 156/706 |
| 2014/0360658 A1* | 12/2014 | Schneider | B32B 27/32 |
| | | | 156/247 |

* cited by examiner

LABEL

CROSS-REFERENCE TO RELATED APPLICATIONS(S)

This application claims priority to Australian Application No. 2016900383, filed Feb. 5, 2016, the entire content of which is herein incorporated by reference.

FIELD OF INVENTION

The present invention relates to a releasable label for applying onto a container or packaging.

BACKGROUND OF THE INVENTION

Meat for large grocery stores such as supermarkets is usually processed onsite before being placed on sale. Typically, whole meat and poultry carcasses from abattoirs are delivered to the grocery stores where they are cut and packaged onsite for sale. However, grocery stores have recognised that processing the meat in-store increases cost.

As such, some grocery stores have started using offsite processing plants to reduce handling of such carcasses in-store. These processing plants receive carcasses directly from abattoirs for cutting and packaging into retail ready sized packs for distribution to the grocery stores.

Similarly, these processing plants can receive produce directly from farms for cleaning and packaging for distribution to the grocery stores.

These retail ready sized packs are transported to the grocery stores in crates which can also serve as display units at the grocery store to reduce further handling time.

These crates are labelled to provide information about their contents such as for example the date of processing, the processing plant, and the type and the weight of the processed contents.

The labels used may be non-adhesive tickets inserted into mouldings within the exterior surface of the crates or labels that attach to the exterior surface of the crate via the use of pre-applied pressure sensitive adhesive.

After the crates have been emptied, the crates are sent to a cleaning plant where the labels are removed before the crates are washed and sanitised. The cleaned crates are then re-used.

During the cleaning process, the labels are manually removed before the crates are sent into an automated washing tunnel to be washed and sanitised.

A significant part of the cleaning cost is incurred by the manual removal of the labels from the crates.

Labels comprising face materials made entirely of paper-based material have been used in an attempt to avoid manual removal of the labels from the crates during the cleaning process. The paper-based labels allow ingress of water into the label to dissolve or disperse the adhesive holding the label to the crate. However, this process in itself faces several problems.

For example, it is difficult to completely remove the adhesive on these labels during the cleaning process because the residence time of the crates in the washing tunnel is often too short to allow complete dissolution or dispersion of the adhesive. As a result, the residual adhesive on the labels removed during the cleaning process often cause these labels to re-attach to the same crate or another crate. When this happens, the re-attached labels have to be manually removed which is labour intensive and costly.

Another problem is that labels comprising face materials made entirely from paper are moisture-sensitive and have a tendency to swell and wrinkle in high moisture or wet environments such as for example in the processing plant, refrigerated storage and display in retail stores. This reduces the aesthetics of the label and may adversely impact the legibility of the label.

SUMMARY OF THE INVENTION

An embodiment of the invention relates to a label comprising a body having a first side for attaching to a container and a second side for displaying information, the first side includes a releasable adhesive for attaching the label to a container, wherein the releasable adhesive is treatable to cause the label to be separated from the container, and at least a part of the body is heat sensitive such that the label curls towards the first side to conceal part of the releasable adhesive when the label is heated to hinder the label separated from the container from re-attaching to the container.

The present invention provides a label that is separable from a container such that the separated label is hindered from re-attaching to a container. Advantageously, residual adhesive from separated label does not have to be completely removed from the label in order to hinder the separated label from re-attaching to a container.

Suitably, the label has varying heat sensitive shrinking properties (through a thickness of the label) from the first side to the second side of the body of the label which causes the label to curl toward the first side of the body of the label when heated.

Suitably, the curling of the label is solely caused by shrinkage of the label. The curling is not caused by other forces, for example, manual rolling of the label to cause it to curl.

The label curls towards the first side regardless of the initial state of the label. The label may be in an initial planar state, for example, when it is applied to a planar surface. Alternatively, the label may be in an initial curved state, for example, when the label is applied to a curved surface such as the surface of a bottle. The curved surface may be a convex or a concave surface.

The label may be a composite or have a layered structure. The heat sensitive part of the body may be in the form of regions or layers. For example, when the label is a composite, the first and second sides of the body may include heat sensitive and non-heat sensitive regions. The regions may be distributed along the width, thickness, plane or length of the body.

When the label has a layered structure, the first and second sides of the body may be layers of the label, wherein one layer is heat sensitive.

The label may curl in one direction when heated. The curling may be either in a machine direction or a transverse direction.

Different shrinking properties of each region/layer of the label may cause the label to curl towards the first side of the body of the label.

The ability of the label to curl may be imparted by heat sensitive shrinking properties of the first side of the body of the label. The heat sensitive first side may be a region of a composite label or a layer of a label having a layered structure.

Some advantages provided by the ability of the label to curl are (i) exposing more releasable adhesive to be solubilised or dispersed, (ii) removing the label from the container in the first instance, and (iii) concealing at least some of the residual releasable adhesive to hinder reattachment of the separated label to a container.

The container may be a crate for holding meat and/or fresh produce.

The label may be removable from the container by a cleaning apparatus. The cleaning apparatus enables multiple containers to be cleaned in a continuous or batch process. Suitably, the cleaning apparatus may be automated. For example, the cleaning apparatus may be a washing tunnel including a conveyor system and a chamber that allows multiple containers to be cleaned either continuously or in batches.

The releasable adhesive may be a pressure sensitive adhesive so that it can be applied by being pressed onto the container. Suitably, the releasable adhesive is a hot melt pressure sensitive adhesive.

The releasable adhesive may be alkali sensitive such that the releasable adhesive is soluble or dispersible when exposed to an alkaline environment. Suitably, the releasable adhesive is an alkali sensitive thermoplastic adhesive.

The releasable adhesive may include styrene.

The releasable adhesive may be a hot melt pressure sensitive adhesive based upon block copolymers. Suitably, the block copolymer is an ABA block copolymer. More suitably, the ABA block copolymer includes styrene. Even more suitably, the ABA block copolymer is a styrene-isoprene-styrene ABA block copolymer.

Using an alkali-sensitive adhesive provides a means for dissolving or dispersing the adhesive while providing relatively stable attachment of the label to the container in high humidity environments. For example, the adhesive can be solubilised or dispersed by spraying the label with an alkaline solution such as a caustic solution while the adhesive maintains its integrity in high humidity environments such as in cold storage or at the supermarkets where the pH is typically neutral.

The amount of releasable adhesive used may be at least twice the amount used for a conventional pressure-sensitive label.

Suitably, the amount of releasable adhesive used for the label ranges from 25-60 gsm. Suitably, the amount of releasable adhesive used is about 50 gsm.

The releasable adhesive may be applied to the label as a layer. The layer of adhesive may have a thickness ranging from 20-60 microns. Suitably, the layer of adhesive has a thickness of about 50 microns.

The amount and/or thickness of the layer of adhesive enables the label to securely adhere to a container with uneven surfaces, for example dimpled or pimpled surfaces, by increasing contact between the adhesive and the uneven surface.

The releasable adhesive may be treated to solubilise or disperse at least some of the releasable adhesive to separate the label from the container. For example, the label may be exposed to an alkaline environment to solubilise or disperse some of the releasable adhesive. Suitably, the alkaline environment has a minimum pH of 12.

The second side may be printable. Suitably, the second side is a printable layer. Suitably, the printable layer is a thermoprintable layer. More suitably, the thermoprintable layer is printable by direct thermal or thermal transfer imaging processes.

The second side may be used to display information about the container or the contents in the container, such as for example the date of processing, the processing plant, and the type and the weight of the processed contents.

The label may be non-perishable when subjected to high humidity environments. In this respect, the printable layer may not consist (i.e. composed entirely) of cellulose. Suitably, the printable layer is non-paper based. Using a non-cellulose or non-paper based layer provides stability to the label in high humidity environments by reducing ingress of moisture into the body of the label.

The printable layer may be a thermoplastic layer. Suitably, the thermoplastic layer is a polyester or a polyolefin. Suitably, the thermoplastic layer is polypropylene.

The density of the printable layer may range from 0.50 to 0.91 g/cc. Suitably, the density of the printable layer is about 0.72 g/cc.

The thickness of the printable layer may range from 60-100 microns. Suitably, the thickness of the printable layer is about 90 microns.

The label may shrink along a transverse direction when heated to curl the label towards the first side of the body of the label. Suitably, the first side of the body of the label shrinks by at least 50% of its original width along a transverse direction when heated.

The label may be heated above the glass transition temperature ($T_g$) of the heat sensitive region/layer. For example, the heating may be conducted by immersing the label in water at 95° C. for 30 seconds for a heat sensitive layer comprising PETG.

The direction of curl along a transverse direction or a machine direction may be controlled by substituting the conventional high temperature heat setting process which is performed immediately after stretching during the manufacture of the heat-sensitive layer before forming the label with an annealing step wherein the stretched heat sensitive layer is annealed at or about its $T_g$. Suitably, the label may be annealed at a temperature ranging from 65 to 110° C.

The subsequent application of heat above the annealing temperature range causes the heat sensitive layer to contract to its original pre-stretched dimension.

To impart a transverse direction curl, the heat sensitive first layer is stretched along a transverse direction while heated at a temperature ranging from 85-160° C. This serves to orient the polymer molecules along the axis of stretching. The layer is then annealed at or about its $T_g$ before forming the label.

To impart curl in a machine direction, the heat sensitive layer is stretched in a machine direction while heated at a temperature ranging from 85-160° C. and annealed up to a maximum temperature of 110° C. before forming the label.

In this specification, the expression "machine direction" refers to the direction the label travels during processing (typically along the length of a label) and the expression "transverse direction" refers to a direction that is across the label (typically along the breadth of a label).

Although not bound by theory, it is believed that when the set heat sensitive layer is heated above its $T_g$, the heat sensitive layer would relax along the direction the layer was stretched. This would cause the layer to shrink in either the machine or transverse direction back to its original dimensions.

The direction of curl towards the first side may be controlled by positioning the heat sensitive layer adjacent to the printable layer which forms the second side.

In this respect, the printable layer may not possess heat sensitive shrinking properties. This biases the heat sensitive layer towards curling to the first side of the body of the label. When referring to the printable layer not possessing heat sensitive shrinking properties, this means that although the printable layer is flexible enough to shrink with the heat sensitive layer when the heat sensitive layer is heated, the printable layer per se does not shrink when heated.

The heat-sensitive layer may have a minimum density of 1.28 g/cc. Suitably, the heat-sensitive layer has a maximum density of 1.4 g/cc.

The density of the label increases the weight of the label compared to a conventional label to make it less likely for the label to become airborne during the cleaning process due to the turbulence of the washing sprays. This makes it less likely for the released label to reattach to a container.

The heat sensitive region/layer may have a thickness ranging from 30-60 microns. Suitably, the heat sensitive region/layer has a thickness of about 50 microns.

In one embodiment, the label comprises an inner heat sensitive region/layer which faces the container to which the label is adhered (i.e. the first side) and an outer region/layer for displaying information which faces away from the container (i.e. the second side).

The outer region/layer may not possess heat sensitive shrinking properties. In this respect, the outer region/layer may shrink with the inner region/layer when the inner region/layer is heated. However, the outer region/layer per se does not shrink when heated. As such, the arrangement of the inner heat-sensitive region/layer adjacent to the outer region/layer causes the label to curl inwardly to conceal at least part of the inner region/layer when the label is heated.

The heat sensitive first side may comprise a polymer, i.e. the region/layer comprising the first side may comprise a polymer. Suitably, the polymer is any one of polyester, polyethylene terephthalate, glycol modified polyethylene terephthalate, oriented polystyrene, oriented polypropylene, cyclic olefin copolymer, polylactic acid or polyvinyl chloride.

When heated, the label curls towards the first side of the body of the label to conceal at least a portion of the releasable adhesive to hinder some or all of the releasable adhesive on the label from re-attaching to a container, for example in a cleaning apparatus. Suitably, the releasable adhesive is concealed within the curled label.

Another embodiment of the invention relates to a method of forming a label as described previously. In an embodiment, the present invention provides a method of forming a label comprising a body having a first side for attaching to a container and a second side for displaying information, wherein the first side includes a releasable adhesive for attaching the label to a container, including:

(a) forming a heat sensitive substrate which shrinks towards the first side of the body of the label to conceal at least a portion of the releasable adhesive when heated; and (b) applying the releasable adhesive to the heat sensitive substrate for attaching the label to the container, wherein the releasable adhesive is treatable to allow the label to be separated from the container.

The heat sensitive substrate possesses heat shrinking properties.

Step (a) may include:
(ai) extruding a resin from die; and
(aii) forming the heat sensitive substrate from the resin.
Step (a) may include:
(aiii) stretching the heat sensitive substrate in one direction whilst heating the substrate.

Step (aiii) may include stretching the heat sensitive substrate along a transverse direction.

Step (aiii) may include stretching the heat sensitive substrate in a machine direction.

The substrate in step (aiii) may be heated to a temperature ranging from 85 to 160° C. Heating the substrate at a temperature from 85 to 160° C. whilst being stretched in either the machine direction and/or the transverse direction orients the polymer molecules along the axis of stretching.

In contrast, non-shrink substrates are subjected to a heat setting process at very high temperatures for a few seconds immediately after stretching (e.g. 270 to 320° C.). This develops crystallinity in the substrate and sets the molecular orientation up to its melting temperature so that the substrate is prevented from shrinking below that temperature.

To make the substrate heat shrinkable in the orientation of stretching, the heat setting process is replaced with an annealing step at around the $T_g$ of the substrate. This enables the substrate to shrink to its original dimensions unhindered by crystallinity when the film is exposed to temperatures above the $T_g$.

Step (a) may include:
(aiv) annealing the stretched heat sensitive substrate at about the $T_g$ of the resin/heat sensitive substrate.

The step of annealing the stretched heat sensitive substrate determines and controls the curling direction of the label when the label is subjected to the cleaning process.

Step (b) may include applying a 20-60 micron thick releasable adhesive layer onto the heat sensitive substrate. Suitably, step (b) may include applying a 50 micron thick releasable adhesive layer onto the heat sensitive substrate.

The method may include a step (c) of applying a display layer to the heat sensitive layer. The display layer may be applied to heat sensitive substrate such that the releasable adhesive forms the first side of the body of the label and the display layer forms the second side of the label.

The display layer may be used for displaying information about the container or the contents in the container such as for example the date of processing, the processing plant, and the type and the weight of the processed contents.

The display layer may be a printable layer. Suitably, the printable layer is a thermoprintable layer. More suitably, the thermoprintable layer is imageable by direct thermal or thermal transfer printing processes.

The printable layer may not consist of cellulose. Suitably, the printable layer is non-paper based.

The printable layer may be a thermoplastic layer. Suitably, the thermoplastic layer is a polyester or polyolefin. Suitably, the polyolefin is polypropylene.

Another embodiment of the invention relates to a method of applying and removing a label as described previously from a container. In an embodiment, the present invention provides a method of applying and removing a label from a container, including:

(a) attaching a label comprising a body having a first side for attaching to the container and a second side for displaying information to the container, wherein the first side includes a releasable adhesive for attaching the label to the container, and at least a part of the body has heat sensitive shrinking properties;

(b) treating the releasable adhesive to allow the label to be separated from the container; and (c) heating the label to curl the label towards the first side to conceal at least a portion of the releasable adhesive to hinder the separated label from re-attaching to the container.

Step (b) may include exposing the label to an alkaline environment to dissolve or disperse at least part of the releasable adhesive. Suitably, the alkaline environment has a minimum pH of 12.

Step (b) may include exposing the label to the alkaline environment for a maximum residence time of 30 seconds. The alkaline environment may be a caustic solution having a minimum pH of 12.

The label may be treated by spraying the label with an alkaline solution to solubilise or disperse at least some of the releasable adhesive. Suitably, the treatment process excludes soaking the label in an alkaline bath.

Step (c) may include heating the label above the $T_g$ of the heat sensitive region/layer. Suitably, step (c) includes heating the label at a temperature ranging from 65-110° C.

Another embodiment of the invention relates to a method of removing an attached label as described previously from a container. In an embodiment, the present invention provides a method of removing an attached label from a container, the attached label comprising a body having a first side for attaching to a container and a second side for displaying information, wherein the first side includes a releasable adhesive for attaching the label to the container, and at least a region/layer of the label has heat sensitive shrinking properties, including:

(a) treating the releasable adhesive to allow the label to be separated from the container; and (b) heating the label to curl the label towards the first side to conceal at least a portion of the releasable adhesive to hinder the separated label from re-attaching to the container.

Step (b) may include heating the label above the glass transition temperature ($T_g$) of the heat sensitive region/layer.

Step (b) may include heating the label at 95° C. for 30 seconds.

The method of removing a label may be performed by a cleaning apparatus. The cleaning apparatus enables multiple containers to be cleaned in a continuous or batch process. Suitably, the cleaning apparatus may be automated. For example, the cleaning apparatus may be a washing tunnel including a conveyor system and a chamber that allows multiple containers to be cleaned either continuously or in batches.

It should also be noted that the residence time of a container in the cleaning apparatus is at most about 30 seconds. Accordingly, it is difficult to completely remove the adhesive on the labels during this time to prevent the labels from re-attaching to a container in the cleaning apparatus. The present invention provides a means to do so without extending the residence time of the containers in the cleaning apparatus.

Generally, during the label removal process, step (a) solubilises or disperses at least a portion of the releasable adhesive to reduce contact between the label and the container and step (b) causes the heat sensitive region/layer of the label (and consequently, the label) to curl towards the first side of the body of the label to conceal at least some of the residual releasable adhesive on the label.

Step (a) may include exposing the label to an alkaline environment to dissolve or disperse at least part of the releasable adhesive. Suitably, the alkaline environment has a minimum pH of 12.

Step (a) may include exposing the label to the alkaline environment for a maximum residence time of 30 seconds. The alkaline environment may be a caustic solution having a minimum pH of 12.

The label may be treated by spraying the label with an alkaline solution to solubilise or disperse at least some of the releasable adhesive. Suitably, the treatment process does not include soaking the label in an alkaline bath.

Step (b) may include heating the label at or above the $T_g$ of the heat sensitive region/layer. Suitably, the label is heated at a temperature ranging from 65-110° C.

Heating the label causes the label to curl which (i) exposes more releasable adhesive to be solubilised or dispersed by the alkaline environment and (ii) conceal at least some of the residual releasable adhesive to hinder reattachment of the separated label to a container.

BRIEF DESCRIPTION OF DRAWINGS

A preferred embodiment of the present invention is hereinafter described by way of example only, with reference to the accompanying drawings, wherein.

DETAILED DESCRIPTION

Figure 1:
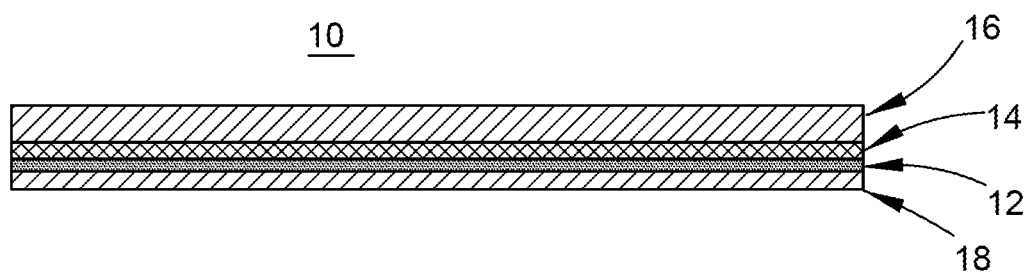
FIG. 1 is cross-sectional view of a label according to one form of the present invention.

One form of a label as defined by the invention is marked as 10 in FIG. 1.

The label 10 includes a body having a first side for attaching to a container, such as for example a crate for holding meat and/or fresh produce, and a second side for displaying information.

The first side includes a releasable adhesive for attaching the label to the container. In FIG. 1, the releasable adhesive is in the form of an adhesive layer 12 which includes a hot melt pressure sensitive ABA block copolymer based adhesive. The amount of releasable adhesive used is about 50 gsm and the thickness of the adhesive layer is about 50 microns. The thickness and amount of adhesive on the releasable adhesive layer 12 enables the label 10 to be securely applied to the container which may have a pimpled surface. This is achieved because the adhesive layer 12 is sufficiently thick to contact and adhere to the tips and sides of the pimples.

The releasable adhesive is treatable by a cleaning apparatus which separates the label from the container. In one example, the cleaning apparatus is an automated washing tunnel including a conveyor system and a chamber that allows multiple containers to be cleaned either continuously or in batches.

Multiple containers are placed in the cleaning apparatus to remove the labels attached to containers before the containers are washed and sanitized.

At least part of the label 10 possesses heat sensitive shrinking properties to enable the label 10 to curl towards the first side to conceal at least a region of the releasable adhesive when the label 10 is heated by the cleaning apparatus. In FIG. 1, the heat sensitive part is a heat sensitive layer 14 comprising a glycol modified polyethylene terephthalate (PETG) shrink film.

The second side includes a display layer 16 comprising a 90 micron thick biaxially oriented polypropylene layer having a density of about 0.72 g/cc.

The layered arrangement of label 10 is such that the heat sensitive layer 14 has on one side the releasable adhesive layer 12, and on the other side the display layer 16.

To form label 10, PETG resin is extruded from a die to form the heat sensitive layer 14. At this stage, the heat sensitive layer 14 possesses an amorphous structure without any crystallinity or molecular orientation.

The heat sensitive layer 14 is then stretched in one direction, for example either in a machine direction or a transverse direction, when heated at a temperature ranging from 85 to 160° C. This orients the polymer molecules along the axis of stretching.

The stretched heat sensitive layer 14 is subsequently annealed at the temperature range of 65 to 110° C., which is the $T_g$ range of PETG, and cooled.

If the heat sensitive layer 14 is stretched and subsequently annealed in a machine direction, the formed label 10 would curl along the machine direction towards the first side of the body of the label when heated. Alternatively, if the heat sensitive layer 14 is stretched and subsequently annealed in a transverse direction, the formed label 10 would curl along the transverse direction towards the first side of the body of the label when heated.

The releasable adhesive layer 12 and the display layer 16 are then applied to opposite sides of the heated and stretched heat sensitive layer 14 to form the label 10. The formed label 10 is then applied to a release liner 18 for use later.

The label 10 is applied to a container by removing the release liner 18 and applying the label to a surface of the container. The surface of the container may be planar or curved.

When the label 10 is to be removed from the container, the container is placed in the cleaning apparatus where the container is sprayed with a dilute caustic solution having a minimum pH of 12.

In an example where the containers are crates, the crates are stacked and placed on the conveyor system of the cleaning apparatus where the crates are heated and sprayed with the caustic solution as the crates move through the cleaning apparatus.

The releasable adhesive layer 12 is alkali sensitive such that when the caustic solution spray contacts the adhesive initially through the edges of the label, part of the adhesive solubilizes or disperses and weakens the contact between the label 10 and the container or packaging. The water resistant polypropylene display layer 16 prevents the solution from contacting the adhesive through the second side (i.e. the outer side) of the label.

Figure 2:
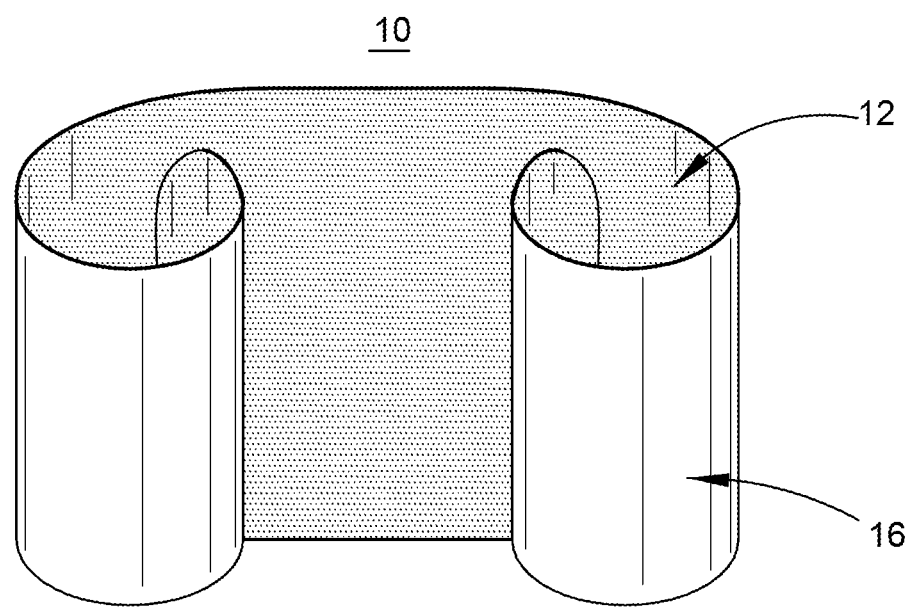
FIG. 2 is an isometric view of a label according to one form of the present invention undergoing transverse direction curling.

The cleaning apparatus also subjects the container to a heated environment that is above the $T_g$ of PETG (i.e. at least 65° C.). The tension within the stretched heat sensitive layer 14 generated by the heated environment and the positioning of the display layer 16 (which does not possess heat sensitive shrinking properties) adjacent to the stretched heat sensitive layer 14 causes the label to curl towards the first side of the body of the label (i.e. away from the second side). The curling direction may be in the machine direction or the transverse direction. FIG. 2 illustrates the label 10 undergoing transverse direction curling.

During the curling process, more of the adhesive layer 12 is exposed to the caustic solution spray which in turn solubilizes or disperses more adhesive. As more adhesive is solubilized or dispersed, greater curling occurs which eventually separates the label 10 from the container.

Additionally, as the label 10 curls, residual adhesive on the adhesive layer 12 is concealed within the curled label 10 to hinder the label from attaching to a container in the cleaning apparatus. In contrast, if the label 10 curls towards the second side of the label or if the label 10 does not curl in any direction, any residual adhesive on the adhesive layer 12 would be exposed and increase the likelihood of the separated label attaching to a container in the cleaning apparatus, particularly, when the environment within the cleaning apparatus is typically turbulent which causes the separated labels to be airborne.

When this occurs, the re-attached labels have to be manually removed which is labour intensive and costly.

Figure 3A:
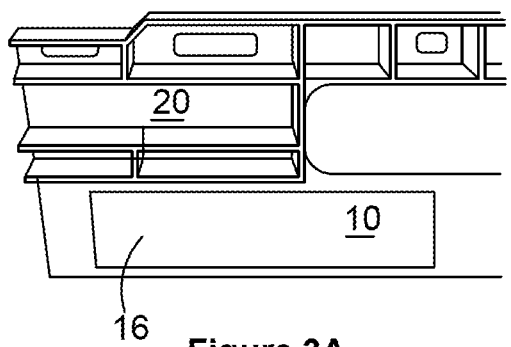
FIGS. 3A through 3D are a schematic of a label according to one form of the present invention undergoing machine direction curling when sprayed with a heated alkaline solution.
Figure 3B:
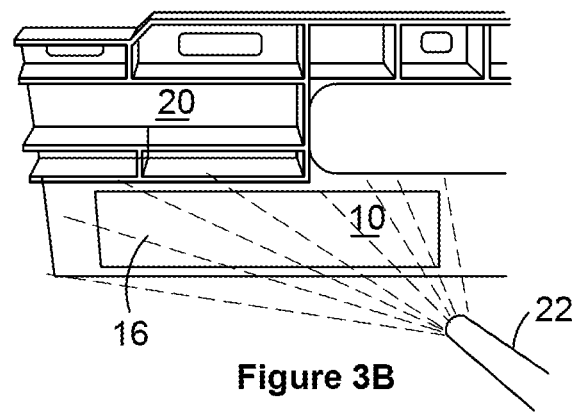
Figure 3C:
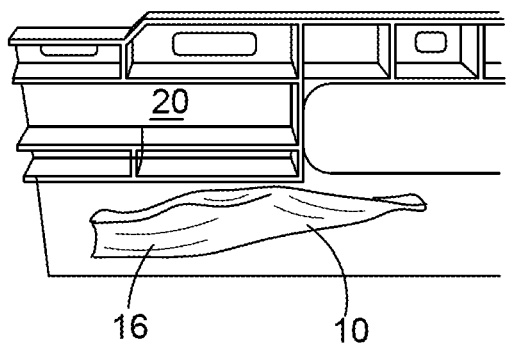
Figure 3D:
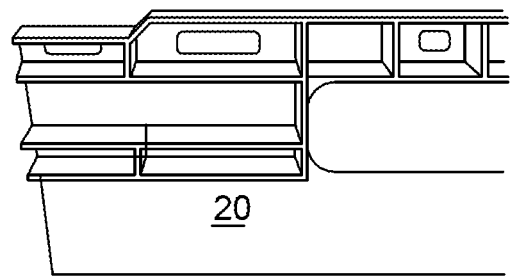
Figure 3D:
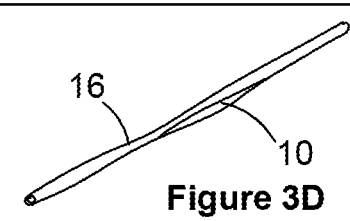

FIG. 3A-D provide a schematic illustrating the stages of a label undergoing machine direction curling when sprayed with a heated alkali solution spray 22. FIG. 3A illustrates the label attached to a container 20; FIG. 3B illustrates the label being sprayed with a heated alkali solution spray 22; FIG. 3C illustrates the initial stages of the label curling inwardly along the machine direction while being attached to the container 20; and FIG. 3D illustrates the separated label which is curled inwardly towards the first side to conceal the adhesive within the curled label.

Figure 4A:
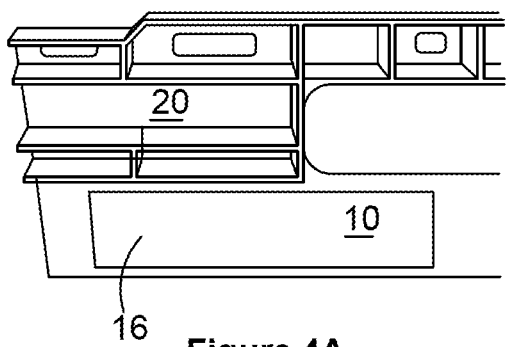
FIGS. 4A through 4D are a schematic of a label according to one form of the present invention undergoing transverse direction curling when sprayed with a heated alkaline solution.
Figure 4B:
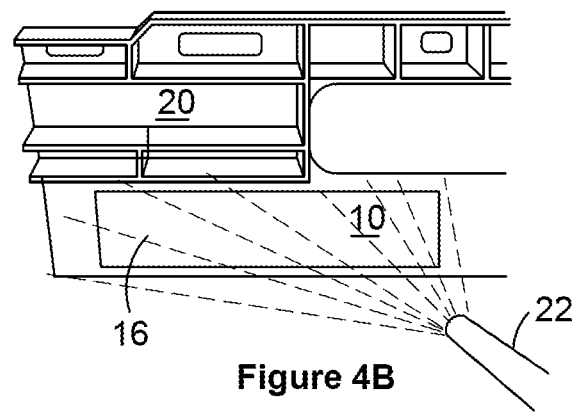
Figure 4C:
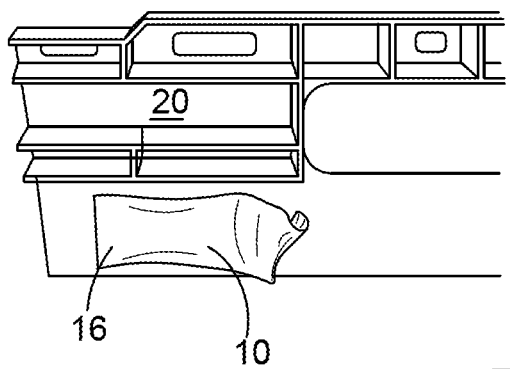
Figure 4D:
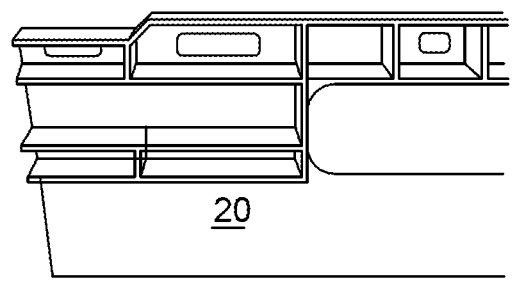
Figure 4D:
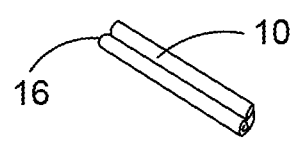

FIGS. 4A-D provide a schematic illustrating the stages of a label undergoing transverse direction curling when sprayed with a heated alkali solution spray 22. FIG. 4A illustrates the label attached to an container; FIG. 4B illustrates the label being sprayed with a heated alkali solution spray 22; FIG. 4C illustrates the initial stages of the label curling inwardly along the transverse direction while being attached to the container; and FIG. 4D illustrates the separated label which is curled inwardly towards the first side to conceal the adhesive within the curled label.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Claims defining the invention are as follows:

1. A label comprising a body having a first side for attaching to a container and a second side for displaying information, the first side includes a releasable adhesive for attaching the label to the container, wherein the releasable adhesive is treatable to cause the label to be separated from the container, and at least a part of the body is heat sensitive such that the label curls towards the first side to conceal part of the releasable adhesive when the label is heated to hinder the label separated from the container from re-attaching to the container.

2. The label according to claim 1, wherein the label curls in one direction when heated.

3. The label according to claim 1, wherein the releasable adhesive is a pressure sensitive adhesive.

4. The label according to claim 1, wherein the releasable adhesive is alkali sensitive such that the releasable adhesive is soluble or dispersible when exposed to an alkaline environment.

5. The label according to claim 1, wherein the releasable adhesive is a hot melt pressure sensitive adhesive based upon block copolymers.

6. The label according to claim 5, wherein the releasable adhesive is a styrene-isoprene-styrene ABA block copolymer.

7. The label according to claim 1, wherein the amount of releasable adhesive used for the label ranges from 25-60 gsm.

8. The label according to claim 1, wherein the releasable adhesive is applied to the label as a layer having a thickness ranging from 20-60 microns.

9. The label according to claim 1, wherein the label shrinks along a transverse direction when heated to curl the label towards the first side of the body of the label.

10. The label according to claim 1, wherein the heat-sensitive part of the body has a density ranging from 1.28 to 1.4 g/cc.

11. The label according to claim 1, wherein the heat sensitive part of the body has a thickness ranging from 30-60 microns.

12. A method of forming the label according to claim 1, including:
   (a) forming the heat sensitive substrate which shrinks towards the first side of the body of the label to conceal at least a portion of the releasable adhesive when heated; and
   (b) applying the releasable adhesive to the heat sensitive substrate for attaching the label to the container, wherein the releasable adhesive is treatable to allow the label to be separated from the container.

13. The method according to claim 12, wherein step (a) includes:
   (ai) extruding a resin from a die; and
   (aii) forming the heat sensitive substrate from the resin.

14. The method according to claim 13, wherein step (a) includes:
   (aiii) stretching the heat sensitive substrate in one direction whilst heating the substrate.

15. The method according to claim 14, wherein step (aiii) includes stretching the heat sensitive substrate along a transverse direction.

16. The method according to claim 14, wherein step (aiii) includes stretching the heat sensitive substrate in a machine direction.

17. The method according to claim 14, wherein the substrate in step (aiii) is heated to a temperature ranging from 85 to 160° C.

18. The method according to claim 17, wherein step (a) includes:
   (aiv) annealing the stretched heat sensitive substrate at about the glass transition temperature ($T_g$)—therein of the resin/heat sensitive substrate.

19. A method of removing an attached label according to claim 1 from a container, including: (a) treating the releasable adhesive to allow the label to be separated from the container; and (b) heating the label to curl the label towards the first side to conceal at least a portion of the releasable adhesive to hinder the separated label from re-attaching to the container.

20. The method according to claim 19, wherein step (a) includes exposing the label to an alkaline environment to dissolve or disperse at least part of the releasable adhesive.

* * * * *